(12) United States Patent
Schreiber

(10) Patent No.: US 8,098,586 B2
(45) Date of Patent: Jan. 17, 2012

(54) DETERMINING CONFIGURATION PARAMETERS OF A MOBILE NETWORK

(75) Inventor: Max Schreiber, Berlin (DE)

(73) Assignee: Tektronix.Inc., Beaverton, OR (US)

( * ) Notice: Subject to any disclaimer, the term of this patent is extended or adjusted under 35 U.S.C. 154(b) by 832 days.

(21) Appl. No.: 11/121,538

(22) Filed: May 3, 2005

(65) Prior Publication Data

US 2005/0255851 A1     Nov. 17, 2005

(30) Foreign Application Priority Data

May 11, 2004   (EP) .................................. 04011182

(51) Int. Cl.
  *H04L 1/00*      (2006.01)
  *H04L 12/26*    (2006.01)
  *H04W 24/00*   (2009.01)
(52) U.S. Cl. .......................... 370/252; 370/254; 455/423
(58) Field of Classification Search .................. 455/423, 455/424; 370/252, 253, 254–258
See application file for complete search history.

(56) References Cited

U.S. PATENT DOCUMENTS

| | | | |
|---|---|---|---|
| 6,996,081 B1* | 2/2006 | Brouwer | 370/335 |
| 7,158,484 B1* | 1/2007 | Ahmed et al. | 370/254 |
| 2003/0100299 A1* | 5/2003 | Ko et al. | 455/423 |
| 2004/0024791 A1* | 2/2004 | Martin et al. | 707/200 |
| 2004/0166891 A1* | 8/2004 | Mahkonen et al. | 455/550.1 |
| 2004/0202140 A1* | 10/2004 | Kim et al. | 370/335 |
| 2005/0288031 A1* | 12/2005 | Davis et al. | 455/452.1 |

FOREIGN PATENT DOCUMENTS

EP     0 848 567 A1     6/1998

* cited by examiner

*Primary Examiner* — Michael Thier
(74) *Attorney, Agent, or Firm* — Francis I. Gray; Matthew D. Rabdau; Michael J. Fogarty, III

(57) ABSTRACT

A method of determining configuration parameters of a mobile network topology for testing and monitoring purposes at an interface (Iub) located between a first node and a second node of the mobile network where between the first and the second node there exist several channels includes finding the channel having signaling information, analyzing signaling information to determine the configuration parameters, updating the configuration parameters dynamically, and performing a monitoring activity or test scenario based on the configuration parameters.

11 Claims, 3 Drawing Sheets

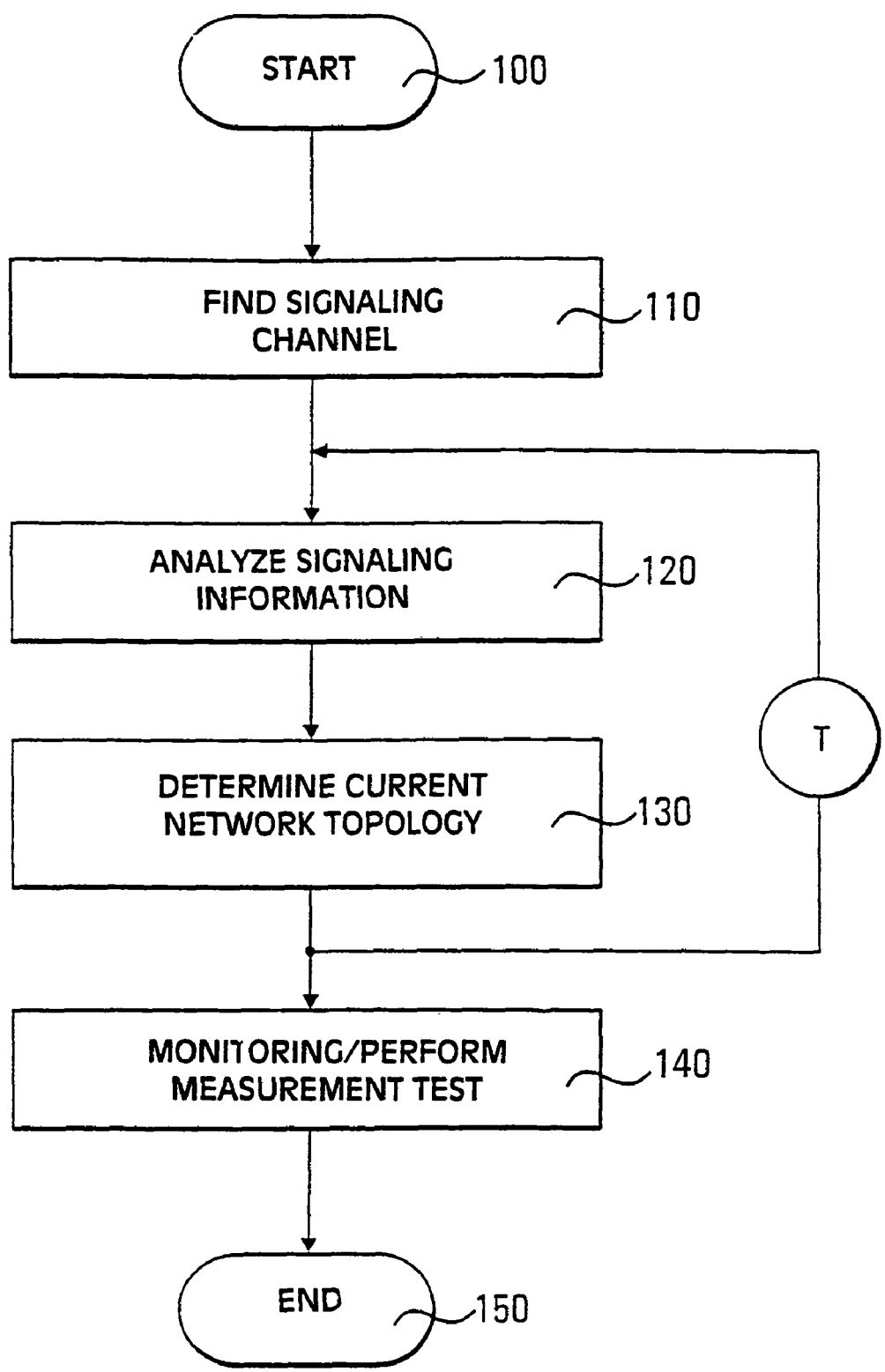

DETERMINING CONFIGURATION PARAMETERS OF A MOBILE NETWORK

BACKGROUND OF THE INVENTION

The present invention relates to protocol testing, and more particularly to a method of determining configuration parameters of a mobile network from signaling information during network startup, which configuration parameters are periodically updated during network runtime.

The description below uses a UMTS (Universal Mobile Telecommunication System) network for illustrative purposes, but the invention may be applied to networks of other standards, notably mobile networks of future mobile communication standards. Further information on the terms used below in connection with the UMTS network may be obtained from documentation available via the domain www.3GPP.org: Document 3GPP ($3^{rd}$ Generation Partnership Project) TS (Technical Specification) 25.301 provides an overview of channel usage in the UMTS network. Documents 3GPP TS 25.427 and 3GPP TS 25.435 deal with frame protocol, document 3GPP TS 25.321 deals with MAC (Medium Access Control), document 3GPP TS 25.322 with RLC (Radio Link Control protocol), document 3GPP TS 25.331 with RRC (Radio Resource Control) and, finally, document 3GPP TS 25.433 with NBAP (Node B Appliccation Part). Further information on ALCAP (Access Link Control Application Part) may be obtained from ITU (International Telecommunications Union) Recommendation ITU Q.2630.2.

For a better understanding of the problem underlying the invention, FIG. 1 shows a part of the UMTS network with an MSC (Mobile Service switching Center) 10, three RNCs (Radio Network Controllers) 14A, 14B, 14C, three Node Bs 16A, 16B, 16C as well as three mobile units (user equipments—UE) 18A, 18B, 18C (mobile phones), with one or several user equipments being allocated to a cell. In the present example the user equipments 18B, 18C are allocated to cell 1 20A. Between the MSC 10 and each RNC 14 there is arranged one Iu interface each, between RNC 14B and each Node B 16A, 16B, 16C there is arranged one Iub interface each, between RNCs 14A, 14B, 14C there is arranged one Iur interface each, and between mobile units 18A, 18B, 18C and Node B 16B there is arranged one Uu interface each.

To further improve comprehensibility the Iub interface is examined. The functions of Node B are summarized as follows: it forms a logical node, such as the BTS (Base Transceiver Station) in a GSM (Global System for Mobile communication) network; it is responsible for the transmitting and receiving in one or a plurality of radio cells to/from user equipment; it terminates the Iub interface, i.e., the NBAP and the ALCAP; it is used for RF Radio Frequency) power control; and it operates a predeterminable number of radio cells. Node B thus is a base station to which there are connected a plurality of transmitter and receiver antennas, each such antenna combination defining a radio cell. RNC controls the use and the integrity of the radio resources; it terminates RANAP (Radio Access Network Application Protocol), NBAP, ALCAP, RNSAP (Radio Network Subsystem Application Part) and RRC/RLC(Radio Link Control)/MAC; and it forms the central element of the UMTS network. RNC thus is a radio switching station to which a plurality of radio base stations are connected.

The functions of the protocol used at the Iub interface are described as follows: start-up and maintenance of Node B; management of the Iub transport resources; management of the radio resources; measurements of the quality of the air interface; and measurements of the data volume and of the positions of mobile units. It furthermore controls the transfer of operation-relevant system information to the mobile units. Apart from that, the following functions are realised at the Iub interface: traffic management for common channels, i.e., for channels that are applicable to all subscribers connected to the relevant Node B, particularly access control systems; and control of the transmission capacity and data transfer. Moreover, it takes over the functions of traffic management for dedicated channels, i.e., channels allocated to a particular subscriber, notably radio link management, radio link supervision, channel allocation/deallocation, control of the transmission capacity and data transfer. If a real RNC is to be tested from the Iub interface, the network elements emanating from the respective Iub interface to the outside, i.e., the Node Bs, the cells and the user equipments or the network topology connected to an RNC in the direction of the network edge, have to be configured.

If one wants to monitor a high load or generate (by simulation) a high load for a test, the relevant units have to be subjected to loads that come as close as possible to their respective capacity limits. It is possible for an RNC to be allocated to approximately 1,000 Node Bs, each Node B may have up to 24 cells, and each cell in turn may have up to 512 user equipments. It is obvious that making a configuration of this kind manually is troublesome. Modifications of certain parameters, e.g., the movement of user equipment from one cell to another cell, the variation of the transmission capacity (bandwidth) of a Node B, etc., as may occur in actual practice cannot at all be taken into consideration in the configuration with justifiable effort. Therefore, the methods of the prior art only allow making a limited statement about the function and particularly the load capacity of any RNC.

What is desired therefore is to improve the prior art manual method for configuring a network topology, as well as to create the possibility of carrying out tests that come closer to the real, practical behavior of the network than previously.

BRIEF SUMMARY OF THE INVENTION

Accordingly the present invention provides a method of determining configuration parameters to determine the topology of a mobile network based on the realization that the configuration of a network topology is easier for a user if signals of a real network are analyzed. Therefore signaling information transmitted on one of a plurality of channels between two nodes is analyzed. For an UMTS network it is particularly the signaling information in the NBAP, the RRC and the NAS (Non-Access Stratum) layer that is analyzed. Data usually sent to user equipments are collected and analyzed so as to control the data and to then use the data for determining configuration parameters, particularly for determining the network topology. To simplify the test of one or more RNCs in the UMTS network, the configuration parameters are learned from the signalling information. It is particularly for the simulation of mobile units that move within the mobile network for which the network topology has to be known. This information is configured in the RNC. This information is extracted with very limited configuration effort from the signaling information between the Node Bs and the RNCs by using an appropriate device, such as a protocol or network topology analyzer. The device may also be used for monitoring purposes where, for example, the network topology is displayed and within the topology there are shown the positions of the individual units together with their loads and their interferences during air interface transmission. The information required to provide an overview of a current status of the mobile network, such as radio interference measurements, the available bandwidth and the reachability of cells, is taken from the RRC and NBAP measurement messages. Before analyzing the signaling information transmitted on one of the channels, the channel on which signaling information is transmitted is found by analyzing the data transmitted on all channels. In this connection it is noted that NBAP and ALCAP channels (protocols between Node B and the RNC) are pre-configured. RRC channels (protocols between UE and RNC) are signalled in the NBAP and the ALCAP and correspondingly are opened dynamically. Thus with the UMTS network it is only in the case of the RRC that the opening of any channel occurs by analyzing the data transmitted. For finding the channel having the signaling information the method for determining a transmission parameter described in European Patent Application No. 03 017 895.8, incorporated herein by reference, may be used.

To the outer one (Node B) of the two nodes is allocated the plurality of cells, each cell being designed to establish radio contract with at least one mobile unit, with the signaling information containing information for the outer one of the two nodes and/or for a mobile unit on the cells. Such information is addressed to the mobile unit and includes details on which cells neighbor the cell to which the mobile unit is currently allocated. From this information there is derived a position of one cell within the mobile network. When testing any RNC of a UMTS network, the positions of all cells allocated to the RNC to be tested are determined. Such information includes coding information and/or frequency information relating to one of the cells currently neighboring the cell allocated to the mobile unit.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 3 is a signal flow diagram view of an embodiment of the method according to the present invention.

DETAILED DESCRIPTION OF THE INVENTION

Figure 1:
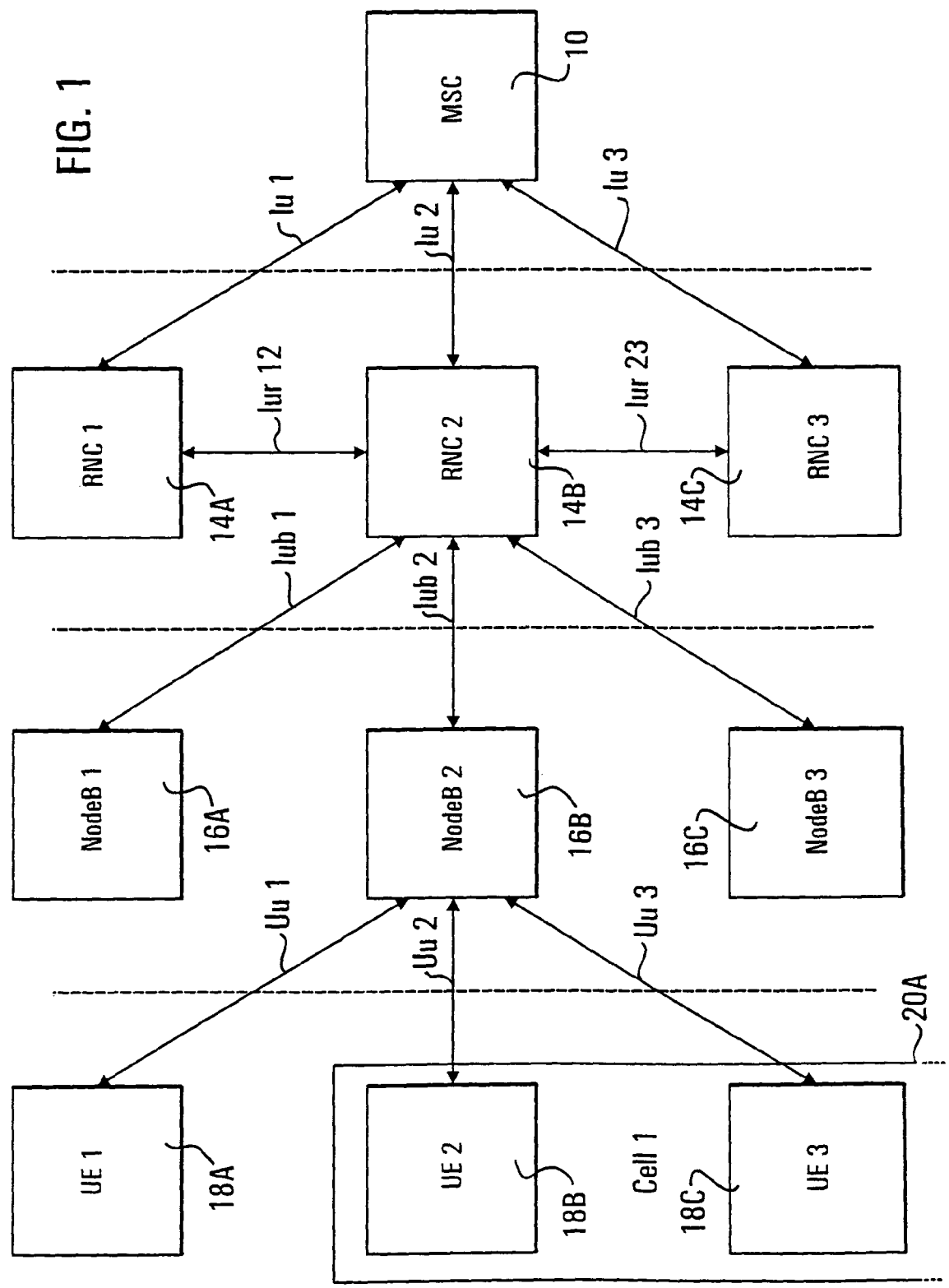
FIG. 1 is a diagrammatic view of a section of a UMTS network with various types of nodes and interfaces.
Figure 2:
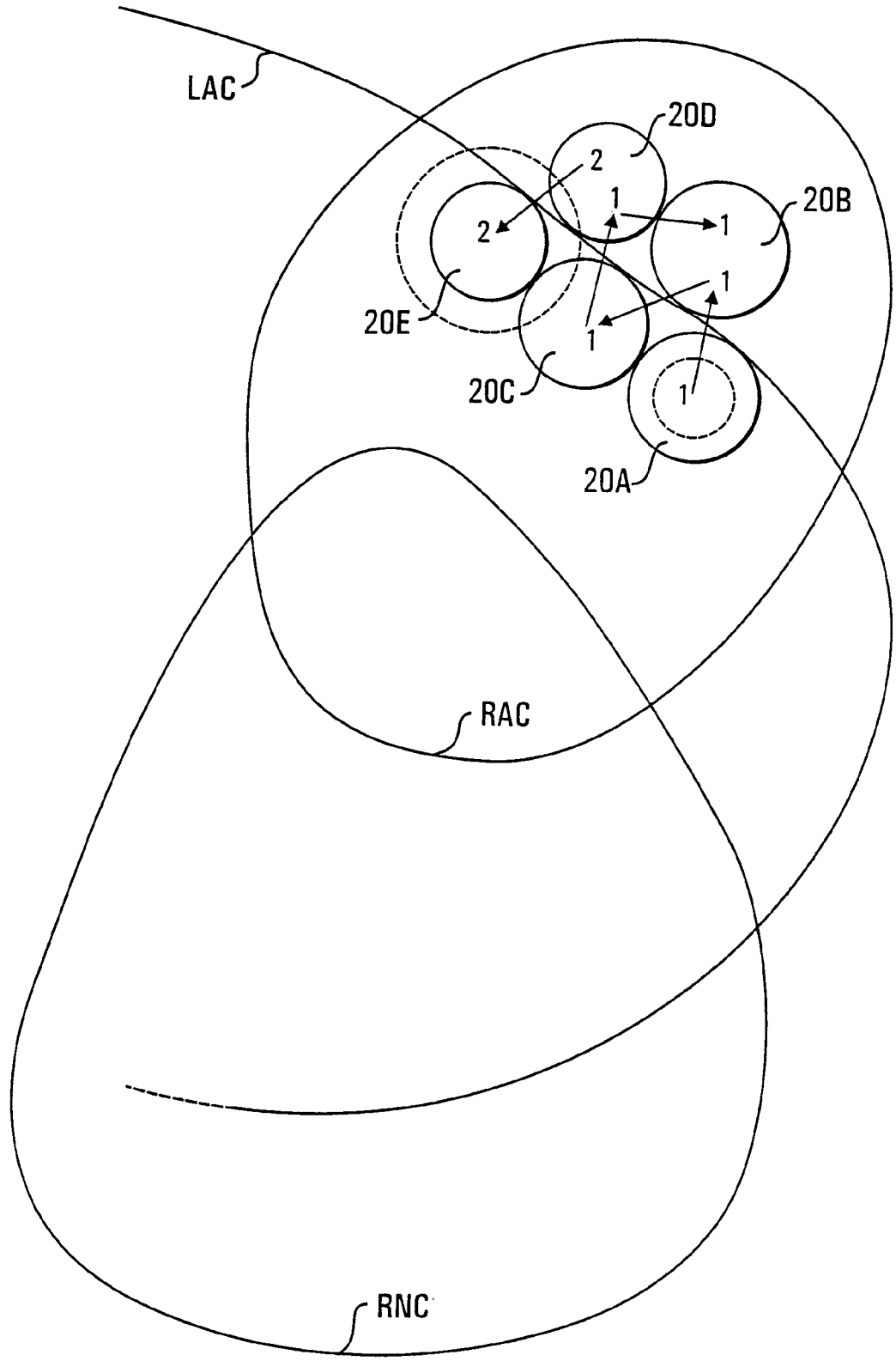
FIG. 2 is a schematic two-dimensional view of different topology parameters of a mobile network.

Referring now to FIG. 2 several cells 20A-20E of a mobile communication system in their spatial arrangement are shown. A user 1 moves from the area of responsibility of cell 20A via the areas of responsibility of cells 20B, 20C, 20D back to the area of responsibility of cell 20B. A user 2 moves from the area of responsibility of cell 20D into that of cell 20E. There is shown by dotted lines for cells 20A, 20E what effect a decrease or increase of the corresponding transmission capacity (bandwidth) has respectively. Also shown is the RAC to which cells 20A-20E belong, the LAC responsible for cells 20A, 20C, 20E and an RNC. For the sake of clarity other cells have not been entered in this schematic.

FIG. 3 shows a signal flow diagram where the method starts at step 100. The first source for the network topology information to be evaluated on the Iub interface is the measurement control information sent from the RNC to single mobiles or broadcast to all mobiles present in a single cell in order to distribute the available radio resources efficiently to mobiles by ordering the mobiles to take only specific cells into account in their cell re-selection procedures. In step 110 a channel is determined from a plurality of channels at the Iub interface which is transmitting the measurement control information or signaling information between the nodes, the signaling information being subsequently analyzed in step 120. From the frequencies and scrambling codes allocated to the relevant cells there is determined in step 130 the configuration parameters that determine a current network topology.

To retrieve the network topology unambiguously the analyzing step is done either statically by analyzing further system information broadcast to the mobiles or dynamically by taking messages into account that are sent during cell re-selection by any mobile. For the static approach the frequency and URA identifier information is retrieved from the broadcast system information messages. Only if the following conditions are true is the static approach fulfilled by taking these parameters into account:

all neighboring cells have the same URA identifier;
    no same primaryScramblingCode exists in the URA or in neighboring URAs;
    the URA identifier is unique in the network; and
    different frequency cells exist in the same URA or are served by the same Node B.

If these conditions are not met, then the analysis is performed dynamically by using a simple call trace. The network is monitored for measurement report messages indicating that an intra- or inter-frequency cell is heard by any mobile. The NBAP links used for the resulting handover procedure are taken into account to identify uniquely the neighboring cell. The test equipment simulating mobiles and Node Bs may generate these messages in cells of interest. For a pure monitoring situation the test equipment may also take the RRC cellUpdate message into account to identify uniquely the neighboring cells. The test equipment retrieves from this information the position of each cell in the network.

Since the topology may be dynamic—the RNC may setup new cells or delete existing cells—the network topology is updated continually. The current network topology is updated dynamically via a timer T, with steps 120 and 130 being repeated at a predetermined time interval. The corresponding results are passed on in step 140 to a unit for performing a test specified by the user. The method ends in step 150. By performing the described method there is determined the spatial arrangement and allocation of the individual elements of the mobile network and the subscribers in the network, which determination is used for the configuration of a test or monitoring apparatus.

The RNC notifies a mobile phone of the cells neighboring the cell currently used by the mobile phone by indicating the corresponding scrambling codes. In this way the computation effort in the mobile phone is reduced. Moreover, the RNC notifies the mobile phone of the cell to which it is to switch as a result of its movement or other subscribers having appeared. Hence, it is possible to execute tests on the basis of a physically meaningful movement of mobile phones within the cells of a network topology, i.e., a movement only via neighboring cells. If, for example, the mobile phone moves out of the area of responsibility of one cell, the responsible RNC either increases the transmission capacity (bandwidth) of the originating source or transfers the mobile phone into the area of responsibility of another cell. In the case of a monitoring application a network operator is provided with information on how the cells are arranged, where the mobile units are located and what the radii of the relevant cells and their respective cell transmission capacities are.

In the UMTS network the two nodes are an RNC node and a Node B, the interface is an Iub interface and the signaling information is either in the RRC Measurement Control messages sent to a single mobile unit or in the NBAP system information update messages in the parameters system information blocks SIB 11 or SIB 12 sent to a Node B from where the contained SIB parameters are further broadcast to the mobile units within a single cell. These messages are usually sent from the RNC to Node B, from where they are passed on to the mobile units. SIB 11 and SIB 12 serve the mobile units as control information of measurement activities. Each message is valid for exactly one specific cell. Blocks SIB 11 and SIB 12 contain the primary scrambling codes (primary-ScramblingCodes) and the frequency information of the neighboring intra- and inter-frequency cells, it being possible for the cells to be identified in an unambiguous way in a limited area where the primaryScramblingCodes of the cells are unique. To further identify the neighboring cells in an unambiguous way in the entire network, the signaling information during cell re-selection is analyzed when the static conditions are not met, as described above. This makes it possible for the test equipment to determine the position of each cell in the network. Intra-frequency cells means that several cells transmit on the same frequency but differ in the primary scrambling codes, while inter-frequency cells transmit on different frequencies. The topology determined is preferably updated dynamically. For the method described this is simple, as the RNC creates new cells or deletes existing cells so that, with the signaling information dynamically analyzed, continuous updating of the network topology is effected during network runtime. For the dynamic updating the RRC Measurement Control Messages and/or the NBAP system information update messages are analyzed.

Apart from the position of a cell in the network there are other topology-relevant pieces of information to be learned from the information transmitted between the nodes, such as, for example, the UTRAN (UMTS Terrestrial Radio Access Network) Registration Area Identifier (URA), particularly from the System Information Block SIB2, Routing Area Codes (RAC) from the NAS Layer Messages, Location Area Codes (LAC) from the NAS Layer Messages, Mobile Network Codes (MNC) from the Master Information Block (MIB) and Mobile Country Codes (MCC) from the Master Information Block. The Master Information Block is transmitted in the same NBAP System Information Message as the SIBs.

A cell is unambiguously defined by its local cell ID (predetermined by Node B and hence unambiguous only within the Node B), by the C ID (predetermined by the RNC—and hence unambiguous within the RNC) and by the primary scrambling code (coding on the air interface). The neighboring cells are characterized by their primary scrambling codes. Preferably the positions of the cells and/or the URA identifiers are determined during the network start-up time. This involves storing for each cell the neighboring cell identifiers in different lists that differ by the mobility procedures that are to be executed. In this way a mobility generator in the test equipment only has to look at the data structure of the cell to which the mobile unit is allocated at that moment in time. A list of neighboring cell identifiers is selected as a function of the desired mobility procedure. From this list there is selected a new cell to which the mobile unit is to be moved on a random basis (Trial-and-Error mode) or as a function of the free bandwidth (Save mode). Thus information processing during simulation runtime is minimized. During the runtime more far-reaching information is collected. The LAC and RAC only are determined during the runtime because there are no NAS messages before that.

A monitoring activity is performed on the basis of the configuration parameters determined. Alternatively, as mentioned above, a test scenario is set up and executed on the basis of the topology configuration parameters determined. As the network topology information includes different abstraction layers that have to be distinguished during the mobility simulation of the mobile units, the mobility generator has to find as a function of the mobility procedure to be executed a neighboring cell that belongs to a different Location Area, Routing Area, URA, Node B, RNC or frequency. A simple approach to storing the network topology consists in filing for each cell in a tabulated form the cell's Location Area, Routing Area, its up to eight different URA identifiers, its Node B, its RNC and its neighboring intra- and inter-frequency cell identifiers. Therefore the network topology information has to be analyzed during the runtime of the test. As part of a test scenario the number of mobile units allocated to a certain cell and/or the bandwidth of mobile units and/or the speed of movement of individual or a plurality of mobile units and/or the transmission capacity of predetermined cells and/or the transmission capacity of at least one mobile unit may be varied.

The test equipment for performing the method includes a call generator that is responsible for the simulation of activities by the users of mobile units, such as the switching on of a mobile phone, the triggering of calls for speech or data transmission and their termination. Therefore, the call generator requires the RAI (Routing Area Identifiers) or LAI (Location Area Identifiers) to establish any control or user level connections.

The mobility generator simulates all mobility actions and therefore requires, in addition to the aforementioned RAI and LAI, the neighboring URAs (UTRAN Registration Area Identifiers), the neighboring intra- and inter-frequency cells and the information as to which Node B and RNC each cell belongs to. The mobility generator may operate in various modes: (a) a Trial-and-Error mode where the mobile units may move into cells whose bandwidths are too small, such that errors in the mobility procedure become possible; and (b) a Save mode where the mobility generator moves the mobile units only into cells having a sufficient bandwidth. This makes sense for tests, for example, in which the total load of the user plane is to be kept at a certain level.

Thus the present invention determines configuration parameters for the topology of a mobile network by analyzing signaling information contained on one of a plurality of channels at an interface (lub) between two network nodes (RNC and Node Bs), and from the signaling information determining the configuration parameters for a current network topology that is dynamically updated periodically.

What is claimed is:

1. A method comprising:
    allocating a plurality of cells to a Node B of a Universal Mobile Telecommunications System (UMTS) network, each of the plurality of cells configured to enter into radio contact with one or more mobile units;
    receiving a signaling message transmitted on a channel of an lub interface arranged between a radio network controller (RNC) and the Node B, the signaling message including information selected from the group consisting of: an RRC measurement control message and an NBAP system information update message, the signaling message including data corresponding to cells neighboring a cell to which a mobile unit in communication with the Node B is allocated, the signaling message containing information for the Node B and the mobile unit;
    determining a configuration parameter of the mobile network based, at least in part, upon the signaling message, wherein determining the configuration parameter includes determining a position of the cell to which the mobile unit is allocated based, at least in part, on the data; and dynamically updating a topology of the UMTS network based, at least in part, upon the configuration parameter.

2. The method according to claim 1, further comprising finding the channel on which the signaling message is transmitted by analyzing data transmitted on a plurality of channels.

3. The method according to claim 1, wherein the data comprises at least one of coding information or frequency information relating to the cells neighboring the cell to which the mobile unit is allocated.

4. The method according to claim 1, wherein the information from the NBAP system information update message is selected from the group consisting of: System Information Block 11 (SIB11) and System Information Block 12 (SIB12).

5. The method according to claim 1, wherein the configuration parameter includes a Registration Area Identifier (URA) from System Information Block SIB2, Routing Area Codes (RAC) from Non-Access Stratum (NAS) Layer Messages, Location Area Codes (LAC) from NAS Layer Messages, Mobile Network Codes (MNC) from Master Information Block (MIB), and Mobile Country Codes (MCC) from MIB.

6. The method according to claim 5, wherein determining the configuration parameter includes determining positions of cells with respect to each other and each cell's respective Registration Area (URA) Identifier during network start-up time.

7. The method according to claim 1, further comprising dynamically updating the topology of the UMTS network as part of performing a network monitoring activity.

8. The method according to claim 1, further comprising dynamically updating the topology of the UMTS network as part of an execution of a test scenario.

9. The method according to claim 8 further comprising varying, as part of the test scenario, at least one of: a number of mobile units allocated to a particular cell, a bandwidth of a mobile unit, a movement velocity of at least one mobile unit, a transmission capacity of predetermined cells, or a the transmission capacity of the particular cell.

10. The method according to claim 1, wherein dynamically updating the topology includes periodically updating the topology.

11. The method according to claim 1, wherein the signaling message is received during cell re-selection by the mobile unit in communication with the Node B.

* * * * *